UNITED STATES PATENT OFFICE.

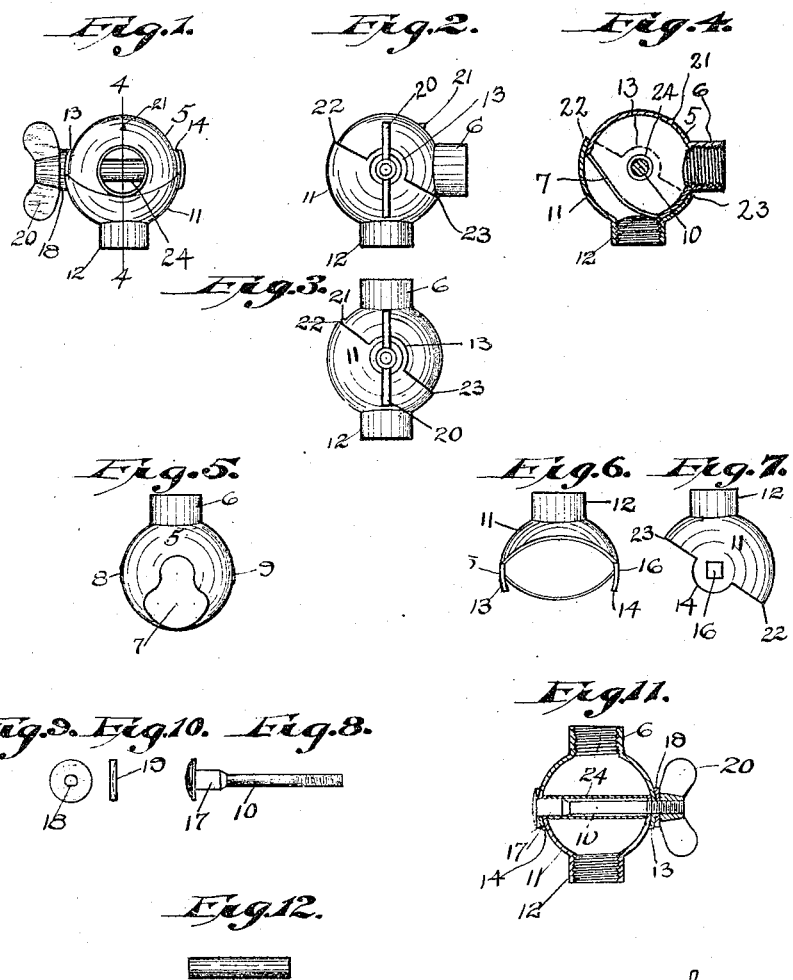

ARTHUR WESTLEY WELLINGTON, OF WATERBURY, CONNECTICUT, ASSIGNOR TO WATERBURY M'F'G. CO., OF WATERBURY, CONNECTICUT, A CORPORATION.

BALL-AND-SOCKET JOINT FOR ELECTRIC FIXTURES.

1,297,763.  Specification of Letters Patent.  Patented Mar. 18, 1919.

Application filed October 22, 1918. Serial No. 259,194.

*To all whom it may concern:*

Be it known that I, ARTHUR W. WELLINGTON, a citizen of the United States, residing at Waterbury, in the county of New Haven and State of Connecticut, have invented a new and useful Improvement in Ball-and-Socket Joints for Electric Fixtures; and I do hereby declare the following, when taken in connection with the accompanying drawings and the characters of reference marked thereon, to be a full, clear, and exact description of the same, and which said drawings constitute part of this application, and represent, in—

Figure 1 a plan view of a ball-and-socket joint embodying my invention.

Fig. 2 a view thereof in right hand side elevation, with the ball-member in its horizontal position in which the axis of its outlet is at a right angle to the axis of the outlet of the cup-member.

Fig. 3 a corresponding view in which the ball-member is rocked to the limit of its movement in the opposite direction so as to bring the axis of its outlet into line with the axis of the outlet of the cup-member.

Fig. 4 a sectional view on the line 4—4 of Fig. 1.

Fig. 5 a detached view in side elevation of the ball-member.

Fig. 6 a view in front elevation of the cup-member.

Fig. 7 a view thereof in side elevation.

Fig. 8 a detached plan view of the binding-screw.

Fig. 9 a plan view of the D-hole lock-washer.

Fig. 10 an edge view thereof in side elevation.

Fig. 11 a view in central section of my improved joint with the axes of its ball-member and its cup-member in line.

Fig. 12 a detached plan view of the sleeve employed to prevent the fixture from being distorted by the pressure of the wing-nut.

My invention relates to an improvement in ball-and-socket joints for electric fixtures, and though particularly designed for use in conjunction with electric desk-lamps, is not so limited, the object being to produce a simple, compact and attractive joint constructed with particular reference to avoiding the exposure and abrasion of the wires which pass through it.

With these ends in view, my invention consists in a sheet-metal ball-and-socket joint having certain details of construction as will be hereinafter described and pointed out in the claims.

In carrying out my invention as herein shown, I employ a substantially spherical ball-member 5 produced from a single piece of sheet-metal and provided with an integral outwardly projecting spiled and tapped collar-like outlet 6, and with a pear-shaped or elongated clearance opening 7, the larger end of which is located directly opposite the outlet 6. The said ball-member is also formed with alined perforations 8 and 9 arranged at a right angle to the axis of the outlet 6, and provided for the reception of a binding-screw 10, the perforation 8 being spaced from the squared portion of the shank of the screw 10. The semi-spherical cup-member 11 of the joint is formed from a single piece of sheet-metal and provided with an integral spiled and tapped outlet 12 which is set off to one side of its center as clearly shown in Fig. 7. The said cup-member is also formed with offsetting lugs 13 and 14, the former having a round-screw hole 15 and the latter having a square hole 16 for the reception of the squared portion 17 of the shank of the binding-screw 10. The projecting end of the said screw receives a D-hole lock-washer 18, the inner face of which is concaved as at 19 to conform to the exterior curvature of the lug 13. A wing-nut 20 applied to the extreme projecting end of the screw bears against the flat outer face of the said washer and provides for drawing the two members of the joint sufficiently together to produce the friction required for maintaining them in any of the positions in which it may be desired to hold the lamp, that is to say, in the horizontal position as shown in Figs. 1 and 2, or in the vertical position as shown in Figs. 3 and 4, or in any position intermediate between these two extreme positions. For positioning the lamp, it is only necessary to unscrew the wing-nut sufficiently to let off the friction between the ball-and-socket members which are thus left free to turn. When the desired adjustment is reached, the nut is turned until the two members are frictionally bound together again. On account of their construction, free passage is left through the two members for the wires which are very little exposed, and the rocking of the two members with respect to each other is effected without abrading the cover of the wires, owing to the placing and open character of the clearance-slot 7.

For limiting the rocking movement of the ball-member 5 to a quarter turn, I provide it with an outwardly struck nib 21 which engages with the edge of the cup-member 11 at the point 22, as shown in Fig. 3. The rocking of the ball-member in the opposite direction is limited by the engagement of its outlet 6 with the edge of the cup-member at the point 23 as shown in Fig. 2. By limiting the rocking movement of the ball-member the ends of its pear-shaped clearance-slot 7 are prevented from abrading the covering of the wires.

By preference I locate a sleeve 24 within the ball-member 5 in line with the perforations 8 and 9 thereof, and adapted in length to fit within it. This sleeve receives the binding-screw 10 and prevents the side walls of the fixture from being distorted or crushed by the action of the wing-nut 20 on the screw 10.

I should add that on account of its form and construction, my improved joint is well adapted to receive the same finish as the other parts of a desk-lamp.

While I have spoken of my improved joint as particularly adapted for use in conjunction with the portable incandescent desk-lamps, it may be used for any other purpose where such ball-joints are available.

I claim:—

1. In a sheet-metal ball-and-socket joint for electric fixtures, the combination with a substantially spherical ball-member having a spiled and threaded outlet and an elongated clearance-opening one end of which is located opposite the said outlet, of a substantially hemi-spherical cup-member having a spiled and threaded outlet to one side of its center, a binding-screw passing through the said cap and ball-members at a right angle to their outlets, and means applied to the screw for the operation thereof in binding the two members frictionally together.

2. In a sheet-metal ball-and-socket joint for electric fixtures, the combination with a substantially spherical ball-member having a spiled and threaded outlet and an elongated clearance-opening one end of which is located opposite the said outlet, of a substantially hemi-spherical cup-member having a spiled and threaded outlet to one side of its center, a binding-screw passing through the said cap and ball-members at a right angle to their outlets, means applied to the screw for the operation thereof in binding the two members frictionally together, and a sleeve located within the ball-member, receiving the said binding-screw and adapted in length to prevent the fixture from being crushed by the action of the said screw.

In testimony whereof, I have signed this specification in the presence of two subscribing witnesses.

ARTHUR WESTLEY WELLINGTON.

Witnesses:
J. S. NEAGLE,
A. C. RECKER.

Copies of this patent may be obtained for five cents each, by addressing the "Commissioner of Patents, Washington, D. C."